June 12, 1934.  C. JOHNSON  1,962,678
REGULATING SYSTEM
Filed May 8, 1931  2 Sheets-Sheet 1
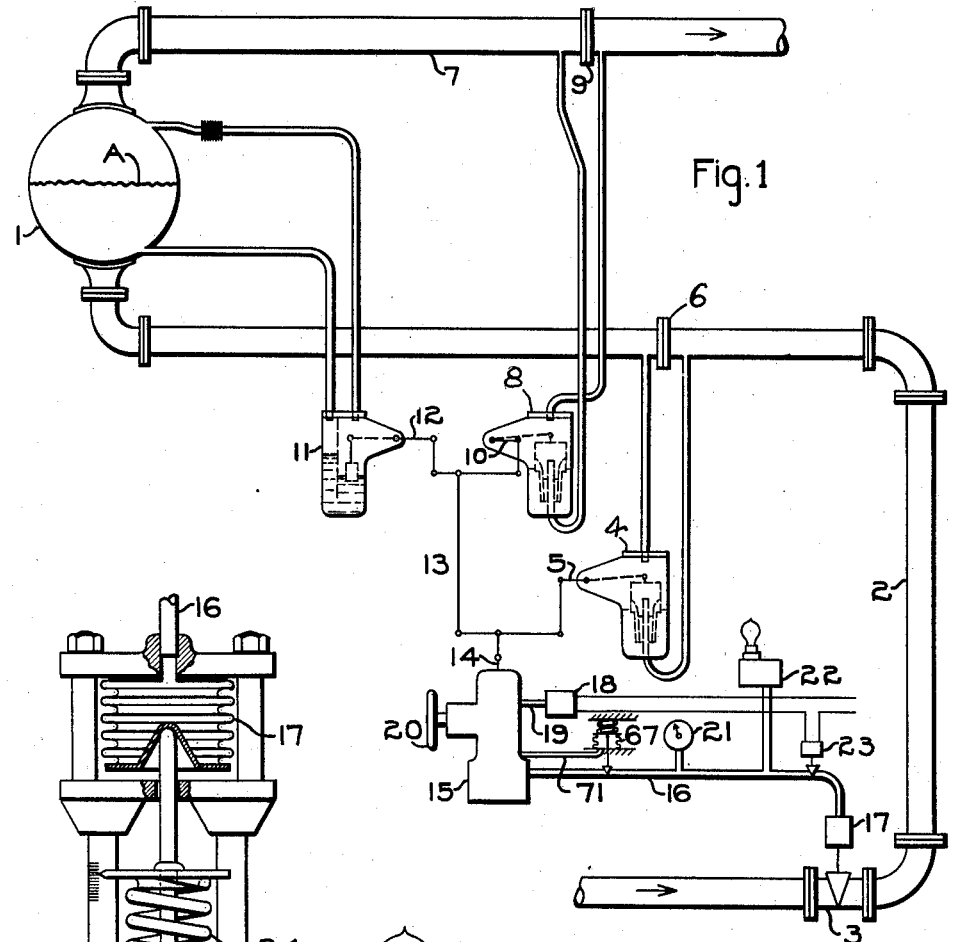
Fig. 1
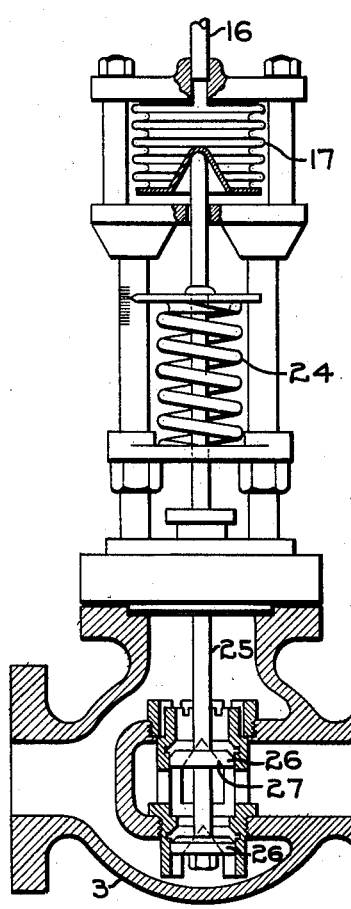
Fig. 2
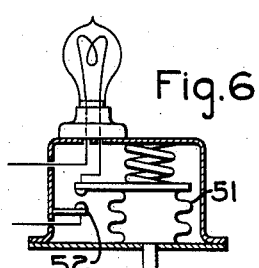
Fig. 6
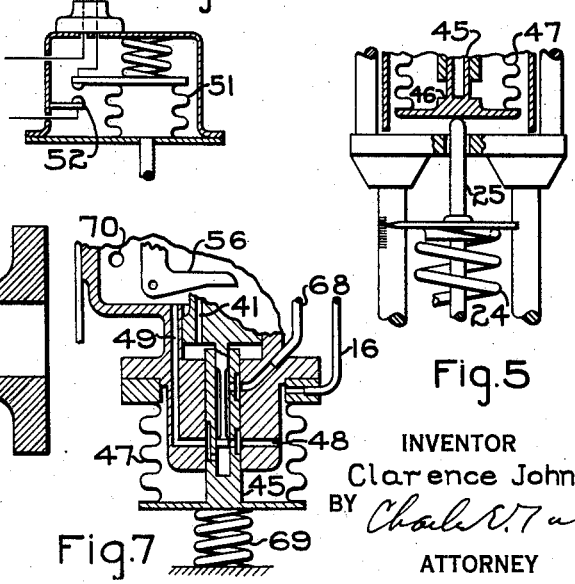
Fig. 7  Fig. 5
INVENTOR
Clarence Johnson.
BY 
ATTORNEY

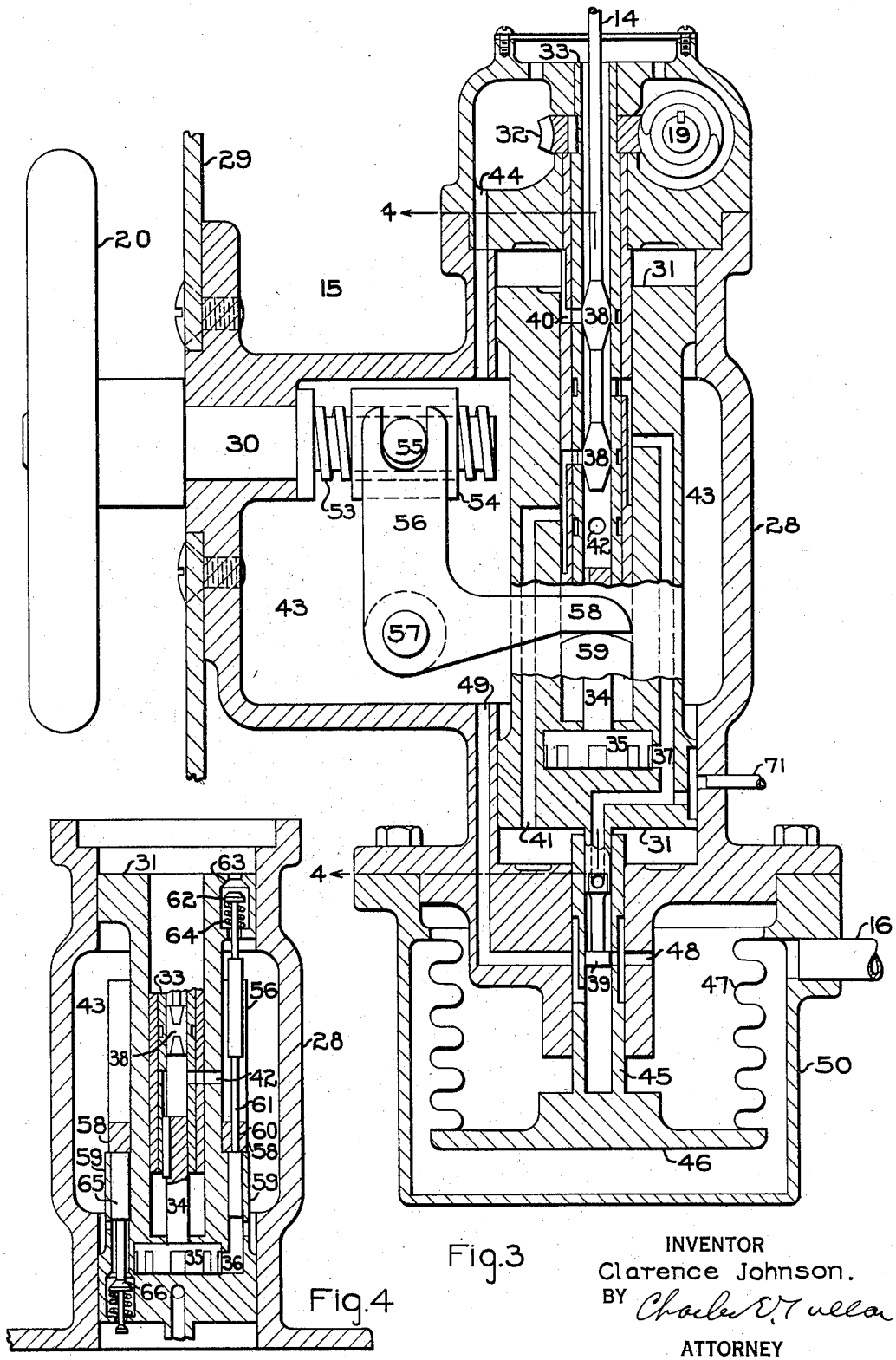

Patented June 12, 1934

1,962,678

UNITED STATES PATENT OFFICE 1,962,678

REGULATING SYSTEM

Clarence Johnson, Cleveland, Ohio, assignor to Bailey Meter Company, a corporation of Delaware Application May 8, 1931, Serial No. 536,046

21 Claims. (Cl. 122—451.2)

This invention relates to regulating systems, and in particular for use with apparatus wherein a relation between variable quantities or factors in the operation of the apparatus tends to vary from a predetermined value. The principal purpose of the regulating system being to cause an adjustment or compensation of the apparatus for returning the relation to the predetermined value.

Such systems are related to the feeding of water to vapor-generators, combustion control, pressure control and similar regulating or control problems. I have chosen to illustrate and will describe such a regulating system embodying my invention in the control of water fed to a steam-generating boiler where the variable quantities; namely, rate of steam flow from the boiler, rate of water flow to the boiler, and quantity of water stored in the boiler as indicated by boiler water level, are desirably used in interrelation to dictate the amount of throttling or opening of a valve in the feed water supply line.

The balancing of feed water input to a boiler with the rate of flow of steam discharged from the boiler and the readjusting of the input to maintain a predetermined level of the water stored in the boiler is disclosed in the patent to Fenno No. 1,649,342 granted November 15, 1927, and my present invention is in part an improvement to the means and apparatus disclosed by the said patent. It must be understood, however, that the use of my invention is not limited to the feeding of water to a boiler, nor when used in connection with a feeding of water to a boiler is it limited to the arrangement shown and claimed in the said Fenno patent.

The primary object of my invention is to provide an improved regulating system utilizing hydraulic fluid power, wherein a regulable factor or quantity in the operation of an apparatus is remotely varied as to value, from an indication of a variable quantity or factor in the operation of the apparatus or from a relation between such variable quantities or factors.

Another object is to provide a ready means for hand operation of the regulable device from a remote point without regard to the regulation normally effective.

A still further object is to provide at the sending or transmitting end of the system an accurate remote indication of the position of the regulable device.

With these and further objects in view, I will describe the arrangement illustrated in the drawings of the embodiment of my invention outlined above.

In the drawings:

Fig. 1 is a diagrammatic representation of my invention used to regulate the feed of water to a steam generating boiler.

Fig. 2 is a vertical elevation, partly in section, of a water flow regulating valve.

Fig. 3 is a vertical, sectional elevation of an operating mechanism.

Fig. 4 is a sectional elevation of a part of the operating mechanism shown in Fig. 3 along the line 4—4 in the direction of the arrows.

Fig. 5 is a partially sectioned elevation of a fragment of an operating mechanism.

Fig. 6 is a sectional elevation of a pressure actuated signal device.

Fig. 7 is a sectional elevation of a fragment of an operating mechanism embodying a modification.

Referring first to Fig. 1, I have indicated at 1 the drum of a steam generating boiler wherein is desirably maintained a water level indicated at A. Water is fed to the boiler through a conduit 2 in amount controlled by the throttling condition of a regulating valve indicated generally at 3. The rate of flow of the water fed to the boiler is indicated by a flow meter 4 having an indicating arm 5 positioned angularly, responsive to a pressure differential resulting from an increase in velocity of the water in flowing past an obstruction within the conduit 2. Such an obstruction for creating a pressure differential bearing a known relation to rate of flow, may be an orifice, as is well known in the art, formed in a plate and held by the flanges 6. The flow meter 4 may be of the liquid sealed bell type as illustrated and described in the patent to Ledoux No. 1,064,748. Such a meter is a differential pressure responsive device and adapted to correct for nonlinear relation between differential pressure and rate of flow, to the end that angular positioning of the indicating arm 5 is by increments directly proportional to increments of rate of flow. I have illustrated by dotted lines within the flow meter 4 and within a similar meter 8 (later to be described) the outline of the internal construction of this type of meter, which is more fully illustrated and described in the above mentioned Ledoux patent.

Steam generated in the boiler, leaves the drum 1 through a conduit 7. A rate-of-flow meter 8 responsive to a pressure differential created by an orifice or similar device held by the flanges 9, positions an indicating arm 10 by increments directly proportional to increments of rate of flow, and in a manner just described relative to the flow meter 4.

Responsive to variations in the level A of the water within the boiler drum 1, I have shown a differential pressure responsive device 11 having a float riding on the surface of a fluid such as mercury in one leg of a U-tube, in a well known manner, to position an indicating arm 12 directly in accordance with changes in the level A. Through the linkage generally indicated at 13 I cause to be vertically positioned the pilot 14 of an operating device indicated in general at 15. The arrangement is such that the rate of water flow to the boiler is balanced against the rate of steam flow from the boiler, causing equal movements of the indicating arms 5 and 10, in opposite directions of rotation, with no resulting vertical motion of the pilot 14, if the water input equals the steam outgo, but if for any reason such as leakage of water from the boiler drum, the level A does not remain constant or at a desirable predetermined line, then a movement of the indicating arm 12 will position the pilot 14 vertically.

Conversely, should the level A and the indicating arm 12 remain at their predetermined positions, but the rate of flow of water to the boiler be not equal to the rate of flow of steam from the boiler, the resulting motion through the linkage 13 will be a vertical positioning of the pilot 14. Such a condition is possible due to change in density of the water below the surface A or for other reasons. In any event, the arrangement is such that the rate of steam flow is balanced against the rate of water flow and a predetermined water level desirably maintained, and when such relations are departed from, the pilot 14 is positioned vertically.

The operating mechanism 15, shown in detail in Figs. 3 and 4 and to be described hereinafter, broadly comprises a translating device for the position of the pilot 14 into a power, remotely applicable for positioning the valve 3 to control the rate of flow of water fed to the boiler through the conduit 2. I have shown the device 15 as controlling a hydraulic pressure fluid whose pressure change is transmitted through a pipe 16 to the interior of an expansible metal bellows 17 for positioning the valve 3. A motor 18 through a shaft 19 rotates continuously to operate certain parts of the device 15, as will be explained in detail. Connected to the pipe 16 are shown a pressure gage 21 as an indicator of the positioning of the valve 3, a signal light mechanism 22 operative when the pressure in the pipe 16 falls below a predetermined value, as well as a solenoid operated valve 23 connected in the electrical circuit of the motor 18 to close off the pipe 16 upon failure of electric power to operate the motor, and a pressure actuated valve 67 to close off the pipe 16 upon the failure of a certain fluid pressure, all of which devices will be in detail explained as to operation and function hereinafter.

In Fig. 2 I have shown a flow control valve such as is indicated generally at 3 for regulating the flow of water fed to the boiler through the conduit 2. An expansible metal bellows 17 is sensitive to internally applied fluid pressure from the pipe 16, tending to position a valve stem 25 in a downward direction, as viewed in the drawing, in a manner such that valve discs 26, carried by the stem 25, are urged away from their seats and the port openings 27 become varyingly uncovered for the passage of water therethrough in proportion to the proximity of the valve discs to their seats. Constantly urging the valve towards closed position is a coiled spring 24 tending to resist the movement of the bellows 17, and resulting in a definite valve opening for each fluid pressure effective through the pipe 16 upon the bellows 17.

In Figs. 3 and 4 I have shown in detail the construction of the device 15, which is in effect an improved torque amplifier, for translating the motion or position of the pilot 14 into a hydraulic fluid pressure or change in pressure effective through the pipe 16 upon the expansible metal bellows 17 of the valve 3 for positioning the same. The arrangement and construction of parts of the device 15 embodies numerous advantages and characteristics and forms a primary part of my invention. Through the use of this device I am able to have the pilot 14 positioned by a factor or relation of factors in the operation of an apparatus with a relatively small amount of power, and amplify the same to the end that a relatively greater amount of power is available to perform useful work either locally or at a distance. Further, the amount of motion or positioning at the remote point of the regulable device may be directly proportional to the amount of movement of the pilot 14 or vary as some function of the movement with a desired mathematical relation. Further, the factor under control of the regulable device at a remote point may serve to correct the factor whose variations caused an initial positioning of the pilot 14, or may bear no relation to said factor. Correction or change in the position of the remote regulable device may or may not result in a positioning of the pilot 14 to its original position as is desired.

In the construction and arrangement of the device 15, a casing 28 may be supported upon the rear of a panel board 29 through and to the front of which extends a shaft 30 carrying a handwheel 20. The panel board 29 in the present example might be located at a point convenient to the boiler operator, near the flow meters 4 and 8 and the water level responsive device 11 and remote from the water feed regulating valve 3.

A part of the interior of the casing 28 is formed as a cylinder for a piston 31, axially movable, but restrained from rotary motion. The motor 18 (Fig. 1) driving through the shaft 19, continuously turns a worm wheel 32, keyed to a sleeve 33 which in turn is splined to and rotates the shaft 34 of a fluid pump 35. It will be seen that the pump 35 may be positioned axially with the piston 31 while rotated relative to the piston, by the splined sleeve 33.

The interior of the casing 28 surrounding the central portion of the piston 31 comprises a fluid reservoir, in this case for oil, from which the pump 35 draws its supply through a channel 36. Oil is discharged under pressure from the pump 35, through the channel 37 to provide a fluid under pressure available at the interior of the sleeve 33 between the lands 38 of the pilot 14 and above the land 39 of a single land pilot forming an extension of the piston 31.

When the pilot 14 is moved axially, its lands 38 move away from alignment with ports communicating with passages 40 and 41 leading above and below the piston 31 respectively. Thus if the pilot 14 is moved upwardly, the hydraulic fluid under pressure available between the lands 38 at the interior of the sleeve 33 passes through the channel 40 to the cylinder at the upper end of the piston 31, tending to force the piston 31 downwardly. Correspondingly, should the pilot 14 be moved downwardly, communication would be established for fluid through the channel 41 to the cylinder below the piston 31 to move same upwardly. At the same time, for movement of the piston 31, fluid must be drained from the opposite end of the cylinder to that to which fluid under pressure is being applied. When the pilot 14 is moved upwardly and pressure is applied to the upper end of the piston 31 to move same downward, then fluid below the piston 31 drains through the passage 41, and the passage 42 to the reservoir space 43 surrounding the piston in the casing 28. Correspondingly, when the pilot 14 moves downwardly, then oil above the piston 31 may drain through the channel 40 to the top of the assembly, flood over the wormwheel 32 and pass through the channel 44 to the reservoir 43. Thus it will be seen that a vertical movement of the pilot 14 results in a positioning of the piston 31 axially in the cylinder formed in the casing 28, and that such motion of the piston 31 will continue until some outside force causes the pilot 14 to be positioned to its original position of closing off the flow of oil to the passage 40 or to the passage 41.

Such vertical positioning of the piston 31, resulting from an axial movement of the pilot 14, will, however, be intermittent, for I have illustrated in Figs. 3 and 4 a construction of the pilot 14 wherein fluid is allowed to pass through the channel 40, or the channel 41, only twice during each revolution of the sleeve 33, rather than continuously whenever the pilot is moved axially from a predetermined shutoff position. At each end of the land section 38 of the pilot are removed inclined segments, so that while the land section 38 is cylindrical, axially in either direction from the cylindrical portion, there are recesses formed with the interior wall of the sleeve 33, and it is through these recesses only, and as the recesses are brought into communication with the port openings, through rotation of the sleeve 33, that fluid may pass from the interior of the sleeve 33 through either the passage 40 or 41. Furthermore, as I have formed the said recesses in an inclined or tapered manner, the area of opening for passage of fluid, upon each revolution of the sleeve 33, and correspondingly upon each alignment of a recess with a port opening, will depend upon the amount of axial movement of the pilot 14 from a predetermined shutoff position.

Certain features of construction of the pilot are disclosed and claimed in the co-pending application of James M. Wilson, Serial No. 515,276 filed February 12, 1931. Certain features of construction of the hydraulic piston controlled by the pilot, location and operation of the hydraulic fluid pump and means of rotation of certain of the parts of the device 15 are disclosed and claimed in the copending application of Joseph C. Albright, Serial No. 498,374 filed November 26, 1930, as well as in my co-pending application Serial No. 515,325 filed February 12, 1931, all of the said co-pending applications having the same assignee as the present application.

The single land pilot 39, formed on an extension of the piston 31, downward as viewed in Fig. 3, moves with the piston and is positioned axially relative to a port opening in a sleeve 45 surrounding the pilot 39; sleeve 45 axially movable relative to the pilot 39 and relatively close-fitting in a cylindrical hole through the bottom of the casing 28. As viewed in Fig. 3, the sleeve 45 comprises an upward extension of a plate 46, which plate forms a movable head for an expansible metal bellows 47, having a fixed head formed by the lower end of the casing 28 to which the bellows is fastened. The degree of expansion of the bellows 47 and correspondingly the position of the head 46, is dependent upon the volume of fluid trapped within the bellows. Fluid passes to and from the interior of the bellows through a channel 48 which communicates with the interior of the sleeve 45. Fluid under pressure is available within the sleeve from the channel 37, and drainage may occur from the sleeve to the reservoir 43 through the channel 49, the control of admission or draining being dependent upon the position of the pilot land 39 relative to the port opening in the sleeve 45.

Should the piston 31 be moved downwardly, then the single land pilot 39 moves downward out of alignment with the port in the sleeve 45 and oil under pressure through the channel 37, available above the pilot land 39, is admitted through the channel 48 to the interior of the bellows 47, moving the bellows head 46 downwardly and causing the port in the sleeve 45 to follow up the land 39 and close off the flow through the passage 48.

Should the piston 31 be moved upwardly, then the land 39 moves upward out of alignment with the port in the sleeve 45 and oil trapped within the bellows 47 will be drained through the channel 48 to the interior of the sleeve 45, and through the channel 49 to the reservoir 43, such drainage from the interior of the bellows 47 causing the head 46 to move upwardly, as will be explained hereinafter. The upward moving of the head 46 carrying upward the sleeve 45 until the port therethrough moves into alignment with the land 39 for closing off said drainage of fluid.

Surrounding the bellows 47 is a hydraulic fluid such as oil, trapped in a container 50 forming an extension of the casing 28 and to which the pipe 16 is joined. The pipe 16 communicates with the interior of the bellows 17 for positioning the valve 3, so that when the oil in the space between the bellows 47 and the container 50 is forced outwardly into the pipe 16, oil from the pipe 16 must enter the bellows 17, or when drawn in a reverse direction from the pipe 16, oil must leave the bellows 17 and enter the pipe 16. It will be seen, then, that a positioning of the bellows head 46 upwardly or downwardly will cause a movement of oil in one direction or the other in the pipe 16 with a corresponding contraction or expansion of the bellows 17 and a positioning of the valve 3. Thus a remote hydraulic operator is provided for the valve 3 comprising a trapped liquid. Expansion of the bellows 17 is opposed by the spring 24 so that when oil is drained from the interior of the bellows 47, thus releasing pressure on the oil trapped between the bellows 47 and the bellows 17, the spring 24 will cause a return movement of oil in the pipe 16 and an upward positioning of the head 46 until the sleeve 45 closes off the drainage of oil from the interior of the bellows 47 to the reservoir 43.

Due to the increased resistance of the spring 24, the pressure of the oil in the trapped system comprising the container 50, the pipe 16 and the bellows 17 must increase as the volume of oil in the bellows 17 increases at the expense of the volume in the container 50. Inasmuch as the position of the valve discs 26 relative to the valve seats is directly related to the amount of spring compression and pressure of oil within the bellows 17, then a pressure gage connected to the pipe 16 can be calibrated to indicate directly in terms of valve position, valve area opening, rate of flow of water through the valve ports 27, or other desirable units. Such a pressure gage is indicated at 21 and may be located upon the panel 29 near the handwheel 20 or otherwise as desired.

Similarly the pressure within the pipe 16 as an indication of valve position, may be used to operate a signal light such as the one indicated at 22 and shown in Fig. 6, in case of a decrease in oil pressure in the pipe 16 below a predetermined value. Normally the pressure within the pipe 16, effective upon the interior of the bellows 51 (Fig. 6), is sufficient to hold the bellows 51 expanded to a degree wherein the contacts 52 are held open circuited and the light remains unlit. If, however, the pressure of the oil in the pipe 16 falls below a predetermined value, the contraction of the bellows 51 allows the contact 52 to be closed, lighting the signal light. I have provided, in case of the electric power failure on the motor 18, a solenoid operated valve 23 to close off the pipe 16, thus allowing the valve 3 to remain in its last position rather than allowing the spring 24 to be fully effective in moving the valve discs 26 to close off passage through the conduit 2; the solenoid valve 23 being wired in series with the motor 18 and normally held open to allow passage through the pipe 16, so that upon a failure of power the solenoid will fail.

For hand operation I have provided a handwheel 20 which has a shaft 30 journaled in a part of the casing 28 and extending within the casing 28 as a screw-thread 53 for moving a nut 54 axially of the shaft when the handwheel is turned. The nut 54 has cylindrical projections 55 for engaging and moving angularly a bell crank 56 around a turning point 57. The other arm of the bell crank 56 is forked as indicated at 58, (Fig. 4) the arms 58 straddling the central portion of the piston 31 and adapted to engage projections 59 of the piston 31 for forcing the piston downwardly.

One of the bell crank arms 58 (Fig. 4) is slotted as indicated at 60 for the through-passage of a valve stem 61 guided at its lower end in a projection 59 and carrying at its uppermost end a valve disc 62 normally urged to seat at 63 by a coiled spring 64 to close off passage between the cylinder above the piston 31 and the reservoir 43.

The other projections 59 is arranged to house and guide a valve stem 65 carrying at its lowermost end a disc 66 normally urged upward by a coiled spring to a seat formed in the lower end of the piston 31 for closing off passage between the cylinder below the piston 31 and the oil reservoir 43.

The valves 62 and 66 when normally seated prevent communication between the cylinder beyond the ends of the piston 31 and the reservoir 43, but are for the purpose of establishing such communication when it is desired to move the piston for hand operation by means of the handwheel 20. It will be seen that under normal conditions of automatic operation through the functioning of the pilot 14, the nut 54 would desirably be in its furthest position toward the panel board 29 and the arms 58 of the bell crank raised to their uppermost position away from the projections 59. Regardless of the position of the piston 31 in its cooperative cylinder, at the time it is desired to go on hand control, a rotation of the handwheel 20 in the proper direction will travel the nut 54 toward the right (Fig. 3) causing the arms 58 of the bell crank to move downwardly and engage first the valve stems 61 and 65, forcing them downward to open passage past the valve discs 62 and 66 for oil from the ends of the cylinder to the reservoir 43. A continued downward motion of the arms 58 would cause their engagement with the projections 59, at the same time holding the above named valves open, and a further turning of the handwheel 20 would force, through the projection 59, the piston 31 downwardly to its extreme of travel in the cylinder. In Figs. 3 and 4, the parts have been shown in a position such that the piston 31 is about central of its vertical travel, and the handwheel 20 has been rotated an amount whereby the nut 54 has traveled toward the right (Fig. 3) an amount sufficient to cause the arms 58 of the bell crank 56 to have engaged the valve stems 61, 65, moving them downward, causing an opening of the valves 62, 66, for releasing fluid pressure from the ends of the piston 31, and just contacting with the projections 59 of the piston, so that movement of the nut 54 to the right, through rotation of the handwheel 20, will result in a downward moving of the piston.

As it travels downward, the lowermost end of the piston 31 will engage the upper end of the sleeve 45 and carry said sleeve and head 46 downward to its lowermost extreme of travel, thus forcing the oil trapped between the bellows 47 and the interior of the chamber 50 outward into the pipe 16 and oil from the pipe 16 to the interior of the bellows 17, expanding the same and causing a movement of the valve discs 26 away from their seats relative to the ports 27. This through a continued rotation of the handwheel 20 in a direction to move the nut 54 towards the right. Of course an intermediate positioning of the discs 26 relative to their seats for throttling the flow of water through the conduit 2 could be accomplished by turning the handwheel 20 only the amount necessary to so position the valve 3.

It will be seen that only through releasing of trapped fluid contained in the cylinder beyond the ends of the piston 31 could the piston be moved toward one end or the other of its travel in the cylinder, and for this purpose I have provided the valves 62 and 66 which are first opened for so releasing the fluid before an attempt is made to move the piston by engaging the arms 58 with the projections 59.

If now, it is desired to remove the hand means from operation by backing the handwheel in the reverse direction and carrying the nut 54 toward the panel board, then a release of pressure of the arms 58 from the projections 59 will allow the action of the spring 24 upon the bellows 17 to react through fluid pressure upon the head 46 and cause the piston 31 to follow the arms 58 in their upward motion.

In Fig. 5 I have shown a fragment of a construction embodying a combination of parts of the operating device 15 and the valve 3 wherein the operating device is located directly above and in communication with the valve 3, and thus the communicating pipe 16 is eliminated as well as the bellows 17 of the valve, and wherein positioning of the head 46 is applied directly against the end of the valve stem 25. The advantageous features of construction of the operating device 15 are retained, as well as the characteristics common to the pilots and hydraulic amplifying system, to be explained hereinafter.

In Fig. 7 I have illustrated a modification wherein I oppose downward movement of the head 46 of the bellows 47 directly by means of a coiled spring 69, rather than by means of the fluid within a chamber 50, as is illustrated in Fig. 3. Furthermore, the loading pressure of the fluid in the pipe 16 is established by reaction of the spring 69 at the modified device 15 rather than by the reaction of a spring such as 24 at the operable controlling device. In this modification, a fluid available to be under control of the single land pilot 39, may be available through a pipe 68 from an outside source, rather than through the channel 37 from the pump 35 (Fig. 3). Excess drainage from the interior of the bellows 47 through channel 49 to the reservoir 43 may pass from the reservoir through an overflow or drain pipe 70 to the external source of fluid under pressure supplying the pipe 68.

I find it desirable to trap the fluid in the bellows 17 to prevent a closing of the valve 3, in case fluid pressure available at the pilot 39 falls below a predetermined value, and to accomplish this I have shown in Fig. 3 a pipe 71 connecting through the casing 28 to communicate with the channel 37. In Fig. 1, the pipe 71 is shown as leading to the interior of an expansible metal bellows 67, spring opposed, and arranged to position a shutoff valve in the fluid pipe 16. When fluid pressure within the channel 37 is above a predetermined value, the spring of the device 67 is overcome, and the corresponding shutoff valve held open for passage therethrough. Should the said fluid pressure fall below said predetermined value, however, then the spring will cause a shutting of the valve in the pipe 16, to trap between said valve and within the bellows 17, the fluid pressure existing therein at time of such valve closure.

In the particular embodiment which I have described, namely that of controlling the admission of water to a boiler, I preferably balance the rate of inflow of water with the rate of outflow of steam and correct the admission of water to maintain a predetermined level within the boiler drum to take care of discrepancies between the relation of input and output, and such losses as may occur by leakage, blowdown, etc. Assuming that conditions are satisfactory, then the valve 3 is in a throttle condition such that the water inflow is equal to the steam outflow, the level A is as desired, and the pilot valve 14 in a predetermined position.

The linkage 13 is so arranged that a demand for increase in the water fed to the boiler will cause a positioning of the pilot 14 upwardly. Thus when the steam flow increases, the indicator arm 10 moves counter-clockwise. When the water flow increases, the indicator arm 5 moves counter-clockwise. When the water level A falls below the predetermined level, the indicator arm 12 moves in a counterclockwise direction. All of which will position vertically the pilot 14 in the proper direction to result in an increasing or decreasing of the rate of water through the conduit 2.

If now there is an increase in the demand for steam, it will be reflected in the flow meter 8 with a counter-clockwise motion of the indicator arm 10 causing the linkage 13 to position the pilot 14 upwardly. The uppermost land 38 of the pilot uncovers the port leading to the passage 40, allowing admission to the cylinder, above the piston, 31, of oil under pressure from the pump 35, to force the piston downwardly. At the same time the lowermost land 38 is positioned upwardly from alignment with the port leading to the passage 41, allowing oil below the piston 31 to drain through the passage 42 to the reservoir 43. Downward movement of the piston 31 and of the single land pilot 39 allows oil from the pump to pass through the channel 37 and the passage 48 to the interior of the bellows 47, resulting in an expansion of said bellows and a movement of the head 46 downwardly. Such downward movement of the head 46 forces oil from within the container 50 out to the pipe 16 and from the pipe 16 to the interior of the bellows 17. Such expansion of the bellows 17 against the reaction of the spring 24 causes a positioning of the valve disc 26 downwardly and an increased port opening for passage of water through the valve 3. The downward positioning of the head 46 and the sleeve 45 has, at the same time, tended to return to a shutoff position, the port in the sleeve 45 with relation to the land 39. The action is intermittent through rotation of the sleeve 33 relative to the recesses beyond the cylindrical lands 38, as described above.

The reverse operation is true in that a decrease in the steam flow through the conduit 7 will result in a decrease in the rate of water fed through the conduit 2.

If now there is a balance between the rate of water input to the boiler and rate of steam output from the boiler, but due to leakage, blowdown or other reasons the level A in the boiler sinks below the predetermined point, then the counterclockwise motion of the level indicating arm 12 causes an upward positioning of the pilot 14 resulting in an opening of passage through the valve 3, for a greater relative feed of water to the boiler to bring the level A back to the predetermined value.

Through the construction described, of the operating device 15, I am enabled to feel the mechanical resistance of the remote moving parts to the force applied. For example, as I turn the handwheel 20 and begin to move the piston 31 downwardly for an opening of the valve 3, I feel through the handwheel 20 not only the mechanical resistance of the parts interior of the device 15, but I feel the building up of fluid pressure in the pipe 16 resulting from the reaction of the spring 24 as the valve 3 moves to open position. Should pressure reaction, friction or other cause tend to keep the valve 3 from opening, then I immediately feel at the handwheel 20 the increase in fluid pressure reacting upon the head 46 necessary to overcome the resistance and move the valve 3. Likewise I know when the extreme open position is reached through the mechanical resistance of the lower end of the piston 31 reaching its extreme of travel in the cylinder. I am thus able while operating through the handwheel 20 at all times to feel any undue resistance to motion of the valve 3 remotely and guard against the continued application of an excessive force which would tend to damage the valve.

The land sections 38 of the pilot 14, disclosed and claimed in the co-pending application of Wilson, provide intermittent action in relation to the rotating sleeve 33, to the end that when the pilot 14 is moved axially out of alignment with the port openings to the passages 40 and 41, fluid under pressure from the pump 35 is admitted to one end or the other of the cylinder by increments or periodically rather than continuously, and thus is minimized the effect of overtravel and hunting. Furthermore, due to the tapering of the recesses formed by the extensions of the pilot beyond the cylindrical lands 38, axial motion of the piston 31 is at a rate depending upon the amount of axial departure of the pilot 14 from a predetermined position, whereas the total motion is proportional to a time integration of such departure.

While I have illustrated and described a preferred embodiment of my invention in connection with the feeding of water to a vapor generating boiler, it is to be understood that I am not to be limited thereby other than as claimed in view of prior art.

What I claim as new and desire to secure by Letters Patent of the United States, is:

1. A regulating system for use with apparatus having a factor which, during operation of the apparatus, tends to vary from a predetermined value, comprising regulating means which when operated tends to restore said factor to its predetermined value, an operating device for said regulating means, said operating device responsive to variations in said factor from the predetermined value, hydraulic means connecting said regulating means with said operating means, and manually operable means at said operating device for making ineffective said operating device and for remotely actuating said regulating means through the intermediary of said hydraulic means independently of variations of said factor from the predetermined value.

2. A regulating system for use with apparatus having a factor which, during operation of the apparatus, tends to vary from a predetermined value, comprising regulating means which when operated tends to restore said factor to its predetermined value, an operating device for said regulating means, an electric motor for said operating device, said operating device responsive to variations in said factor from the predetermined value, hydraulic means connecting said regulating means to said operating device, electric power supply for said motor, and electrically controlled valve means for said hydraulic means responsive to a failure of said electric power and adapted to lock said hydraulic means for maintaining said regulating means in the position it was in when said electric power failed.

3. A regulating system for use with apparatus having a factor which, during operation of the apparatus, tends to vary from a predetermined value, comprising regulating means which when operated tends to restore said factor to its predetermined value, an operating device comprising fluid pressure means for said regulating means, said operating device responsive to variations in said factor from a predetermined value, hydraulic means connecting said regulating means with said operating device, and pressure controlled valve means for said hydraulic means responsive to a failure of said fluid pressure and adapted to lock said hydraulic means for maintaining said regulating means in the position it was in when said fluid pressure failed.

4. A regulating system for use with apparatus having factors which, during operation of the apparatus, tend to vary from a predetermined relation, for maintaining said factors in the predetermined relation, comprising regulating means for one of said factors which when operated tends to restore said factors to their predetermined relation, and an operating device comprising a pilot responsive to variations in said factors from their predetermined relation, said pilot so shaped that upon its departure from a predetermined position said regulating means is positioned in proportion to both the amount and the time of departure of the pilot from its predetermined position.

5. In a regulating system, in combination, a device wherein a relatively weaker control force is used to position a pilot, fluid means controlled by said pilot to provide an amplified force, a piston positioned in a cylinder by said fluid means, means for periodically making effective said fluid means when said pilot is in other than a predetermined axial position, said pilot adapted to vary the effectiveness of said fluid means with the amount of departure of said pilot axially from said predetermined position, a second pilot positioned by the piston, fluid means controlled by the second pilot and effective upon an expansible-compressible chamber to cause variation in volume thereof, regulating means of a factor whose variation produces the relatively weaker control force for positioning the first-named pilot, a second expansible-compressible chamber for positioning said regulating means, a conduit connecting said expansible-compressible chambers, and a pressure fluid trapped by said expansible-compressible chambers and said conduit whereby expansion of the first-named chamber occurs at the expense of the second-named chamber.

6. In a regulating system, in combination, a device wherein a relatively weaker control force is used to position a pilot, fluid means controlled by said pilot to provide an amplified force, a piston positioned in a cylinder by said fluid means, means for periodically making effective said fluid means when said pilot is in other than a predetermined axial position, said pilot adapted to vary the effectiveness of said fluid means with the amount of departure of said pilot axially from said predetermined position, a second pilot positioned by the piston, an expansible-compressible chamber, fluid means controlled by the second pilot and effective upon said expansible-compressible chamber to cause variation in volume thereof, regulating means of a factor whose variation produces a relatively weaker control force for positioning the first-named pilot, a second expansible-compressible chamber for positioning said regulating means, a conduit connecting said expansible-compressible chambers, a pressure fluid trapped by said expansible-compressible chambers and said conduit whereby a change in volume of the first-named chamber occurs at the expense of the second-named chamber, manually operable means for said device for making ineffective said first-named fluid means on said piston and then manually causing a change in volume of said first-named expansible-compressible chamber to effect a remote positioning of said regulating means, and means for indicating the positioning of said regulating means comprising fluid pressure responsive apparatus connected to said conduit.

7. In a regulating system, in combination, a device wherein a relatively weaker control force is used to position a pilot, fluid means controlled by said pilot to provide an amplified force, a piston positioned in a cylinder by said fluid means, means for periodically making effective said fluid means when said pilot is in other than a predetermined axial position, said pilot adapted to vary the effectiveness of said fluid means with the amount of departure of said pilot axially from said predetermined position, a second pilot positioned by the piston, an expansible-compressible chamber, fluid means controlled by the second pilot and effective upon said expansible-compressible chamber to cause variation in volume thereof, regulating means of a factor whose variation produces a relatively weaker control force for positioning the first-named pilot, yieldable means urging said regulating means to position in one direction, and fluid pressure means opposing said yieldable means and controlled by said expansible-compressible chamber.

8. In a regulating system, in combination, a device wherein a relatively weaker control force is used to position a pilot, fluid means controlled by said pilot to provide an amplified force, a piston positioned in a cylinder by said fluid means, means for periodically making effective said fluid means when said pilot is in other than a predetermined axial position, said pilot adapted to vary the effectiveness of said fluid means with the amount of departure of said pilot axially from said predetermined position, a second pilot positioned by the piston, an expansible-compressible chamber, fluid means controlled by the second pilot and effective upon said expansible-compressible chamber to cause variation in volume thereof, regulating means remotely located from said device and having an expansible-compressible chamber for positioning the same, yieldable means for the regulating means for urging the regulating means in one direction and opposing an expansion of said chamber, a conduit connecting the expansible-compressible chamber of the device with the chamber of the regulating means, and yieldable means opposing expansion of the first-named expansible-compressible chamber whereby a loading pressure for the expansible-compressible chamber of the regulating means will be set up in said conduit proportional to the resistance of said last-named yieldable means to change in volume of said first-named expansible-compressible chamber.

9. In a control system in combination with a source of motive power, a plurality of means movable by the motive power, means for regulating the rate of application of the motive power to one of the said plurality of movable means, and means under the joint control of said plurality of means for controlling the application of the motive power to another of said plurality of means.

10. The combination with a force-actuated device, of a force-transmission system comprising, a variable volume liquid holding chamber adapted upon a change of volume to effect a positioning of said device, a second variable volume liquid holding chamber, a conduit connecting said chambers, said liquid holding chambers and connecting conduit comprising a closed fluid system, and means for varying the volume of said second-named chamber.

11. The combination with a conduit through which a fluid flows, of a valve for controlling the rate of flow of fluid therethrough, and means for remotely operating said valve comprising a variable volume liquid holding chamber remote from said valve, means for varying the volume of said chamber, a second variable volume liquid holding chamber adapted upon a change of volume to effect a positioning of said valve, and a pipe connecting said chambers, said liquid holding chambers and connecting pipe forming a closed fluid system.

12. In combination, apparatus for controlling the rate of change in the rate of flow of a fluid to maintain said rate at a predetermined value, comprising means indicative of the difference between the actual and the predetermined rate of change, means for obtaining a speed effect representative of the desired rate of change in the rate of flow of the liquid, means for obtaining a speed effect representative of the actual rate of change in the rate of flow of the liquid, and means for varying the actual rate of change in accordance with the difference in said effects.

13. In a device wherein a relatively weaker control force is used to position a pilot for allowing passage of hydraulic fluid to provide an amplified force, in combination, a cylinder, a pilot, a piston positioned axially in the cylinder by the hydraulic fluid, said piston surrounding the pilot and forming the pilot casing and adapted to be moved axially relative to the pilot, a second pilot positioned by the piston, a second piston moved by hydraulic fluid under the control of the second pilot, and a ported pilot casing positioned by said second piston and adapted to cooperate with said second-named pilot for controlling the rate of flow of hydraulic fluid for moving said second piston.

14. In a power amplifying mechanism, in combination, an axially movable pilot capable of being positioned by a relatively weak control force, a rotatable and axially movable sleeve surrounding the pilot and having ports for the passage of hydraulic fluid, rotating means for said sleeve, a fluid pump fastened to said sleeve and operated thereby, a cylinder, an axially movable piston defining a casing for the sleeve and the pump and cooperating in the cylinder, fluid passages in the piston, said pilot arranged upon axial positioning to control passage of hydraulic fluid from the pump to the cylinder at one end or the other of the piston to cause a movement thereof, a second pilot positioned with said piston, and a second piston forming a sleeve surrounding said second pilot and having ports for the passage of hydraulic fluid, said second pilot arranged on axial movement to permit passage of hydraulic fluid through the ports of the second-named sleeve to effect a movement of the second-named piston, the movement of said second-named piston effecting a closure of said ports of the second-named sleeve.

15. Apparatus for positioning a water feed regulating valve of a steam boiler; comprising in combination, a compressible and expansible liquid-holding chamber adapted upon change in its volume to effect a positioning of said valve, a pipe connecting said chamber to a second similar chamber, said liquid-holding chambers and connecting pipe comprising a trapped fluid system adapted one chamber to increase at the expense of the other, and means actuated conjointly by steam outflow, water inflow and water level for varying the second chamber by expansion and contraction.

16. Apparatus for positioning a water feed regulating valve of a steam boiler to automatically maintain a practically fixed ratio between water inflow and steam outflow; comprising in combination, a fluid actuated abutment for positioning said valve, and fluid means comprising a trapped substantially incompressible liquid for actuating said abutment, said fluid means being actuated conjointly by steam outflow and water inflow.

17. Apparatus for positioning a feed water regulating valve of a steam boiler to automatically maintain a practically fixed ratio between water inflow and steam outflow; comprising in combination, a fluid actuated abutment for positioning said valve, fluid means comprising a trapped substantially incompressible liquid for actuating said abutment in conjoint response to steam outflow and water inflow, and means coacting with said means to prevent water from rising above or falling below predetermined levels in the boiler.

18. Apparatus for positioning a water feed regulating valve of a steam boiler; comprising in combination, a servomotor for said valve responsive to a first fluid pressure, means adapted to control said first fluid pressure and responsive to a second fluid pressure, and means actuated conjointly by steam outflow, water inflow and water level adapted to control the second fluid pressure.

19. Apparatus conjointly responsive to three variable factors in the operation of a steam boiler for positioning a water feed regulating valve; comprising in combination, a servomotor for said valve responsive to a first fluid pressure, means adapted to control said first fluid pressure and responsive to a second fluid pressure, and means actuated conjointly by said three variable factors adapted to control the second fluid pressure.

20. Apparatus conjointly responsive to a plurality of variable factors in the operation of a vapor generator for positioning a liquid feed regulating valve; comprising in combination, a servomotor for said valve responsive to a first fluid pressure, means adapted to control said first fluid pressure and responsive to a second fluid pressure, and means actuated conjointly by said plurality of variable factors adapted to control the second fluid pressure.

21. Apparatus conjointly responsive to a plurality of variable factors in the operation of apparatus converting energy from one form to another for positioning a device controlling at least one of said variable factors; comprising in combination, a servomotor for said device responsive to a first fluid pressure, means adapted to control said first fluid pressure and responsive to a second fluid pressure, and means actuated conjointly by said plurality of variable factors adapted to control the second fluid pressure.

CLARENCE JOHNSON.